United States Patent
Fu

(10) Patent No.: US 7,252,394 B1
(45) Date of Patent: Aug. 7, 2007

(54) LASER PROJECTION DISPLAY AND ILLUMINATION DEVICE WITH MEMS SCANNING MIRROR FOR INDOOR AND OUTDOOR APPLICATIONS

(75) Inventor: Yee-Chung Fu, Fremont, CA (US)

(73) Assignee: Advanced NuMicro Systems, Inc., San Jose, CA (US)

( * ) Notice: Subject to any disclaimer, the term of this patent is extended or adjusted under 35 U.S.C. 154(b) by 88 days.

(21) Appl. No.: 10/723,400

(22) Filed: Mar. 10, 2004

Related U.S. Application Data

(63) Continuation of application No. 10/613,397, filed on Jul. 3, 2003, now abandoned.

(51) Int. Cl.
*G03B 21/14* (2006.01)

(52) U.S. Cl. .................. 353/98; 362/812; 359/212

(58) Field of Classification Search ............... 353/31, 353/34, 37, 98, 99, 201; 348/790, 791, 792, 348/795, 800, 801, 802, 96, 97, 98, 99, 110, 348/112; 359/70, 202, 212, 215, 223, 225, 359/226, 213; 362/800, 812; 358/505, 509, 358/510, 513, 474, 475, 480, 481, 482, 494
See application file for complete search history.

(56) References Cited

U.S. PATENT DOCUMENTS

| | | | | |
|---|---|---|---|---|
| 4,750,045 A | * | 6/1988 | Ohara et al. ............... | 358/494 |
| 5,450,219 A | * | 9/1995 | Gold et al. ................ | 349/5 |
| 5,691,535 A | * | 11/1997 | Boutet ....................... | 250/234 |
| 5,835,249 A | * | 11/1998 | Yamada et al. ............ | 359/201 |
| 5,845,981 A | * | 12/1998 | Bradley ..................... | 353/31 |
| 5,971,545 A | * | 10/1999 | Haitz ........................ | 353/31 |
| 6,128,131 A | * | 10/2000 | Tang ......................... | 359/443 |
| 6,183,092 B1 | * | 2/2001 | Troyer ....................... | 353/31 |
| 6,195,184 B1 | * | 2/2001 | Chao et al. ................ | 359/32 |
| 6,493,149 B2 | * | 12/2002 | Ouchi ........................ | 359/634 |
| 6,508,554 B2 | * | 1/2003 | Hatakeyama et al. ...... | 353/31 |
| 6,511,184 B2 | * | 1/2003 | Yamagishi et al. ......... | 353/31 |
| 6,798,575 B2 | * | 9/2004 | Kobayashi ................. | 359/618 |
| 6,900,916 B2 | * | 5/2005 | Okazaki et al. ........... | 359/202 |
| 6,939,013 B2 | * | 9/2005 | Asao ......................... | 353/98 |
| 6,972,737 B2 | * | 12/2005 | Furukawa et al. .......... | 345/32 |
| 2002/0021419 A1 | | 2/2002 | Yoder et al. | |
| 2002/0149749 A1 | * | 10/2002 | Janssen ..................... | 353/30 |
| 2003/0011751 A1 | | 1/2003 | Sakata et al. | |

\* cited by examiner

*Primary Examiner*—William C. Dowling
(74) *Attorney, Agent, or Firm*—Patent Law Group LLP; David C. Hsia

(57) ABSTRACT

A projection display system includes a light source emitting a light beam, and a reflecting mirror system for scanning the light beam over an image to illuminate the image. The light source can be solid state such as a laser diode. The reflecting mirror system can be one or more MEMS scanning mirrors that rotate to raster scan the light beam over the image. The image can be an advertisement located on a wall, a screen, a sign, or a billboard. The image can also be a semi-transparent image that is projected onto a medium to produce a larger image.

13 Claims, 11 Drawing Sheets

LASER PROJECTION DISPLAY AND ILLUMINATION DEVICE WITH MEMS SCANNING MIRROR FOR INDOOR AND OUTDOOR APPLICATIONS

CROSS REFERENCE TO RELATED APPLICATIONS

This application is a continuation of U.S. patent application Ser. No. 10/613,397, filed on Jul. 3, 2003, now abandoned, and incorporated herein by reference.

FIELD OF INVENTION

The invention relates to an image projection apparatus employing micro-electro-mechanical system (MEMS) scanning mirrors and laser light sources.

DESCRIPTION OF RELATED ART

Various display systems have been developed for illuminating graphics for indoor and outdoor advertisement and entertainment. Some examples of these display systems include illuminated billboards, light-emitting diode (LED) displays, neon light signs, and liquid crystal flat-panels. These display systems typically consume substantial electrical power and are bulky in construction. Thus, substantial efforts are spent to transport, set up, power, and maintain these display systems. In addition, some of these display systems cannot display images with sufficient brightness to be visible indoor under illumination or outdoor under daylight.

Image projection systems utilizing digital micromirror device (DMD), liquid crystal display (LCD) panel, and liquid crystal on silicon (LCoS) technologies are capable of displaying high quality images indoors. These devices typically use two types of high power bulbs, halogen and metal halide, whose lifetime is approximately in the range of 2,000 to 6,000 hours. The lifetime of these bulbs presents a challenge against the constant use of these systems to display images. On the other hand, the lifetime of solid state lasers are over 50,000 hours, an order of magnitude longer than the halogen and metal halide bulbs.

Solid state lasers are known to produce high brightness and saturated colors with low power consumption. Lasers can be used very effectively in laser projection systems, including those for laser printers and laser light shows, where a tightly controlled beam is desirable. These conventional laser projection systems require efficient cooling because they utilize high power lasers. These systems are also inherently cumbersome and expensive because they utilize mechanical deflectors, polygonal mirror, and galvanometer mirror.

SUMMARY

In one embodiment of the invention, a compact, low power projection display system is proved to produce a bright image viewable in both indoor and outdoor environments. The projection display system includes a light source unit that generates monochrome light beams, an optical modulation unit that modulates the monochrome light beams to desired hues and tones, an optical synthesizing device that combines the monochrome light beams into one single light beam, a reflecting mirror unit for scanning the one single light beam to project a two-dimensional image, and an image processing unit that decodes a composite image signal to control signals for the optical modulation unit and the reflecting mirror unit. The projection display apparatus system further includes a sensing unit that generates a feedback signal of the speed and the position of the reflecting mirror unit in order to maintain the synchronization of light radiation and to avoid jitter of the projected image.

The light source unit may be solid state including laser diodes, either edge emitting type or surface emitting type, diode pumped solid state frequency doubled (DPSSFD) laser, or high brightness light emitting diodes. The light source unit may generate light beams in red, green and blue colors for creating a color image, or a single selected color for a monochrome image. The solid state light source unit may emit in free space or be guided in optical fibers for easy assembly.

The image signal processing unit may include a decoder for extracting the vertical and horizontal synchronization signals from the composite image signal for raster scanning the image, a read/write controller for synchronizing the vertical and horizontal synchronization signals with the position and the speed of the reflecting mirror unit, and a memory for buffering the color intensity signals.

The optical modulation unit may include acoustic-optic modulators, magneto-optic modulators, or electro-optic modulators for independently modulating the red, green and blue beams generated by the light source unit. Alternatively, the optical modulation unit may be an electrical circuitry controlled by the read/write controller that directly modulates the timing, duration, and intensity of electrical driving pulses of the light source unit.

After modulation, the red, green, and blue light beams are combined into one single beam by the optical synthesizing device and projected on to the reflecting mirror unit. The optical synthesizing device may include optical elements such as dichroic mirrors and optical lenses.

The reflecting mirror unit may be one or two MEMS scanning mirrors that raster scan the one single light beam horizontally and vertically to form the desired image by oscillating at desired frequencies. For image of 60 Hz refresh rate and XGA resolution of 1024×768 pixels, the horizontal and vertical scanning frequency of the mirrors have to be at least 23 kHz and 60 Hz, respectively. For a one mirror system, the MEMS mirror is capable of scanning both horizontally and vertically. For a two mirror system, one MEMS mirror is responsible for the horizontal scan and the other is responsible for the vertical scan.

In another embodiment of the invention, the projected image is comprised of multiple image tiles generated by multiple light source units reflecting from one reflecting mirror unit. The multiple light source units are oriented such that the resulting image tiles form a seamless image with substantially higher resolution than the resolution achievable by a single light source unit.

In one embodiment of the invention, the projection display system includes a translucent screen as the projection plane and all the components are enclosed in a casing to form a rear projection display system.

In one embodiment of the invention, the projection display system replaces the halogen and metal halide light bulbs of conventional projection display apparatuses employing liquid crystal display (LCD) panel, liquid crystal on silicon (LCoS) device, and digital micromirror display (DMD) device.

In one embodiment of the invention, the projection display system includes a light source unit and a scanning mirror system to project or illuminate a preexisting image.

The image can be an advertisement located on a wall, a screen, a sign, or a billboard. The image can also be located on a semi-transparent medium and be projected onto a medium to produce a larger image.

DETAILED DESCRIPTION OF THE INVENTION

Figure 1:
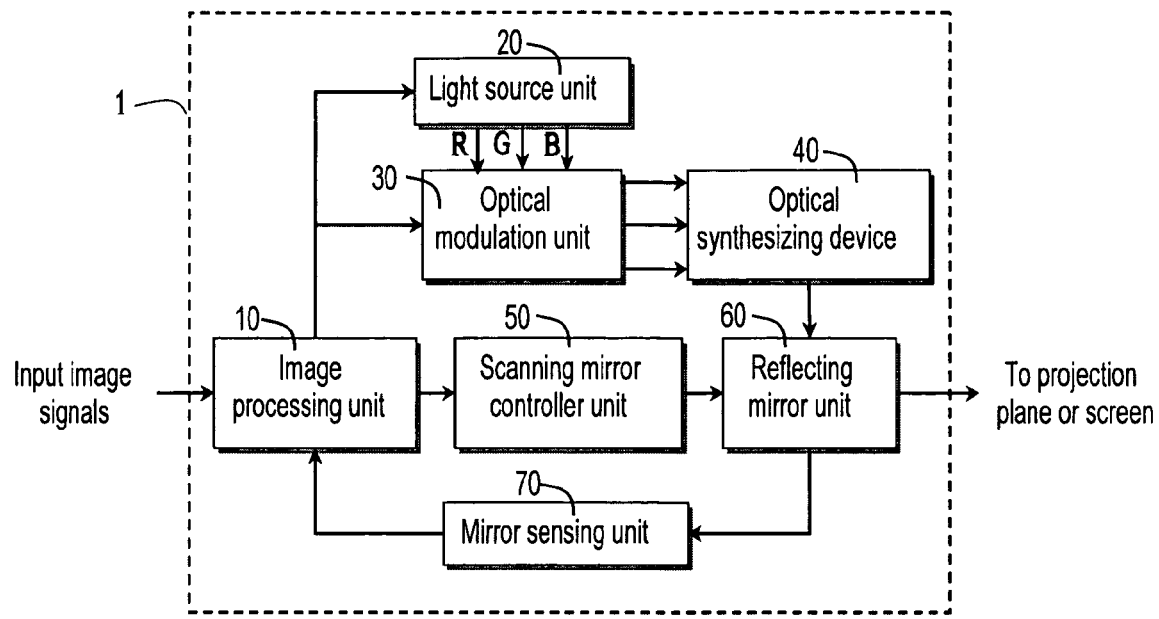
FIG. 1 is a block diagram of a laser projection display system in one embodiment of the invention.

FIG. 1 illustrates a projection display system 1 in one embodiment of the invention. Projection display system 1 includes an image processing unit 10, a light source unit 20, an optical modulation unit 30, an optical synthesizing device 40, a scanning mirror controller unit 50, a reflecting mirror unit 60, and a mirror sensing unit 70.

Figure 1A:
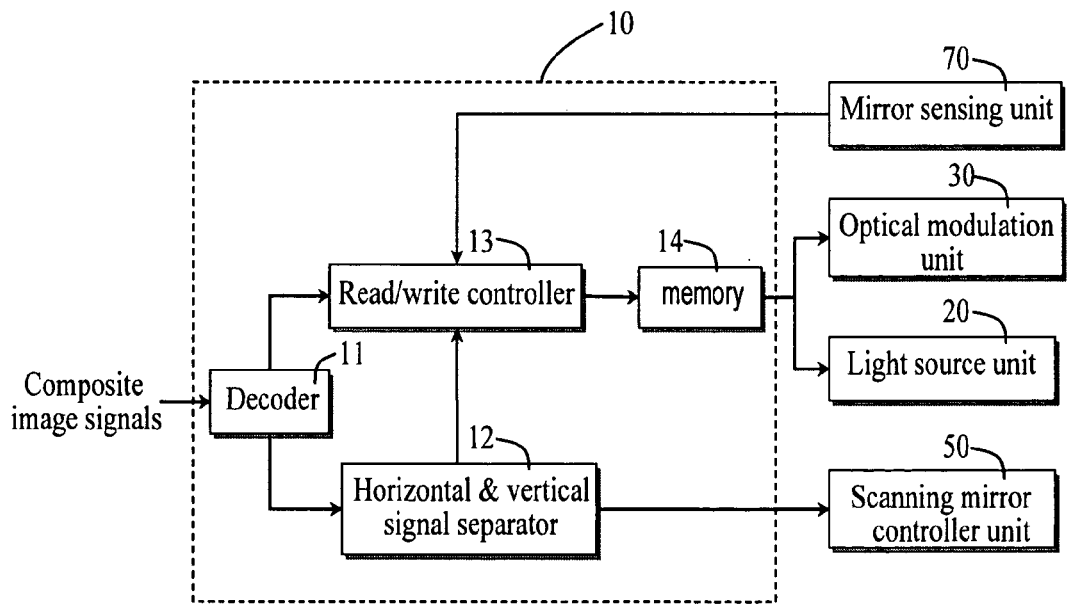
FIG. 1A is a block diagram of an image processing unit in the system of FIG. 1 in one embodiment of the invention.

FIG. 1A illustrates image processing unit 10 in one embodiment. Image processing unit 10 includes (1) a decoder 11 for dividing a composite image signal into a composite synchronous signal, a red signal, a green signal, and a blue signal, (2) a signal separator 12 for separating the composite synchronous signal into a horizontal synchronization signal and a vertical synchronization signal, (3) a read/write controller 13 for controlling the light source unit 20 and synchronizing the vertical and the horizontal synchronization signals with the position and speed of reflecting mirror unit 60, and (4) a memory 14 for buffering the red, green, and blue signals.

Figure 3:
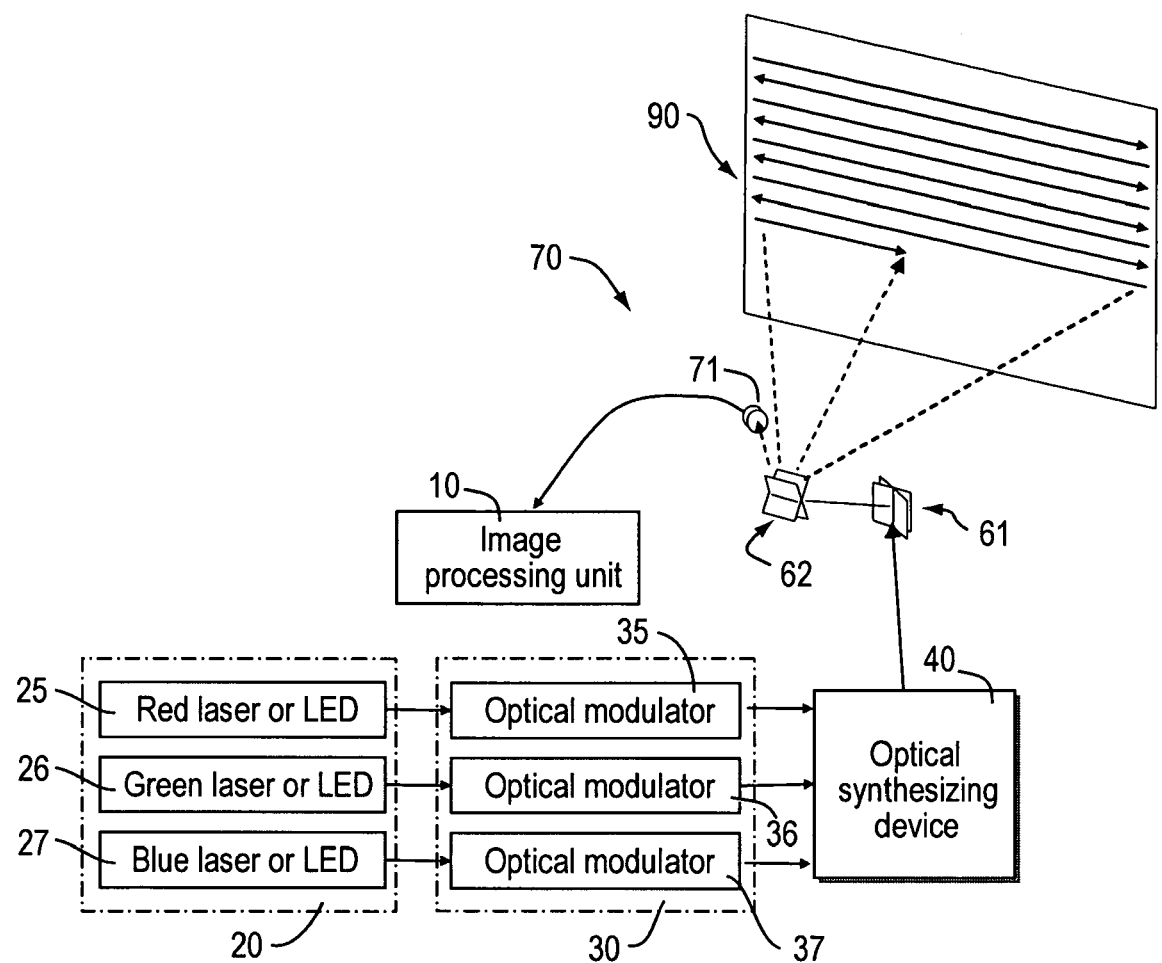
FIG. 3 illustrates an optical sensing unit for detecting the speed and position of the scanning mirror in one embodiment of the invention.

Referring back to FIG. 1, light source unit 20 emits red, green, and blue monochrome light beams. The monochrome light beams can travel in air or in optical fibers to optical modulation unit 30. Optical modulation unit 30 modulates the red, the green, and the blue monochrome light beams to achieve the desired hues and tones in response to the color intensity signals received from image processing unit 10. Optical synthesizing device 40 combines the light beams into one single light path before striking reflecting mirror unit 60. The combined light beam can travel in air or in an optical fiber to reflecting mirror unit 60. Reflecting mirror unit 60, which is capable of both horizontal and vertical scans, reflects the combined light beam in a raster scan to project one or more two-dimensional image 90 (FIG. 3). Scanning mirror controller 50 drives reflecting mirror unit 60 in response to the vertical and horizontal synchronization signals received from image process unit 10.

FIG. 3 shows that light source unit 20 includes three solid state light sources 25, 26, and 27 that generate the red, green, and blue monochrome light beams. Solid state light sources 25, 26, and 27 may be semiconductor edge emitting laser diodes (LD), vertical cavity surface emitting laser diodes (VCSEL), diode pumped solid state frequency doubled (DPSSFD) lasers, or light emitting diodes (LED).

Figure 2:
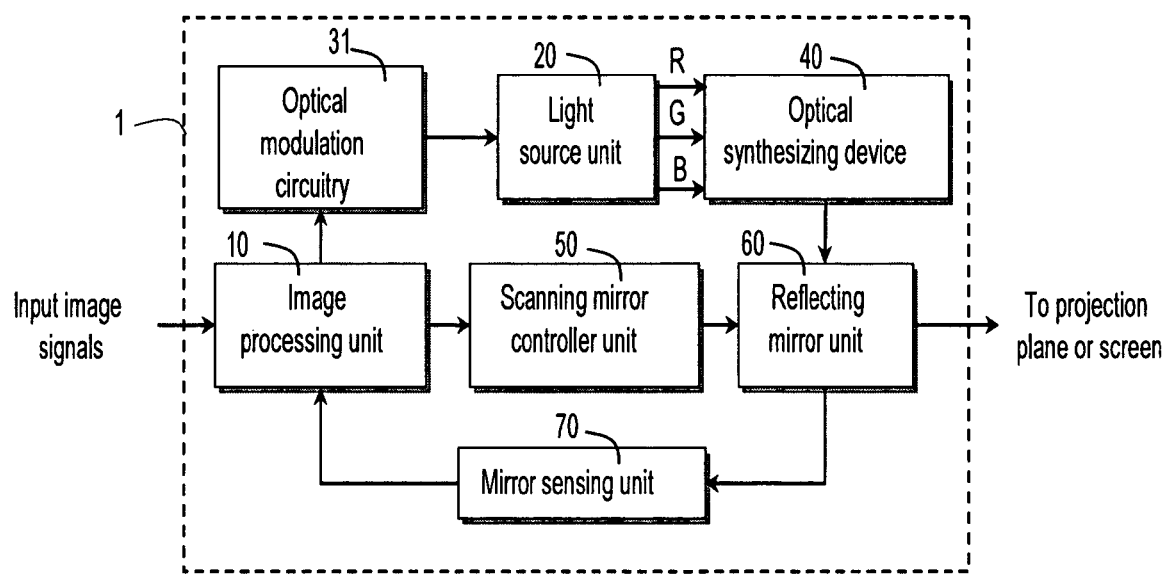
FIG. 2 is a block diagram of a laser projection display system in another embodiment of the invention.

Optical modulation unit 30 includes three optical modulators 35, 36, and 37 respectively receiving the red, green, and blue monochrome light beams. Optical modulators 35, 36, and 37 may be acoustic-optic modulators, electro-optic modulators, or magneto-optic modulators. Alternatively as shown in FIG. 2, optical modulation unit 30 may be a set of electrical circuitry 31 controlled by read/write controller 12 (FIG. 1A) of image processing unit 10. Optical modulator unit 30 then directly modulates the timing, duration, and intensity of the electrical driving pulses of light source unit 20 to change the hues and tones of the red, green, and blue monochrome light beams.

Reflecting mirror unit 60 may be a bi-directional micro-electro-mechanical system (MEMS) scanning mirror, a first MEMS scanning mirror 61 (FIG. 3) rotating about a horizontal axis and a second MEMS scanning mirror 62 (FIG. 3) rotating about a vertical axis, or one or more galvanometer mirrors manufactured by mechanical processes.

Figure 4:
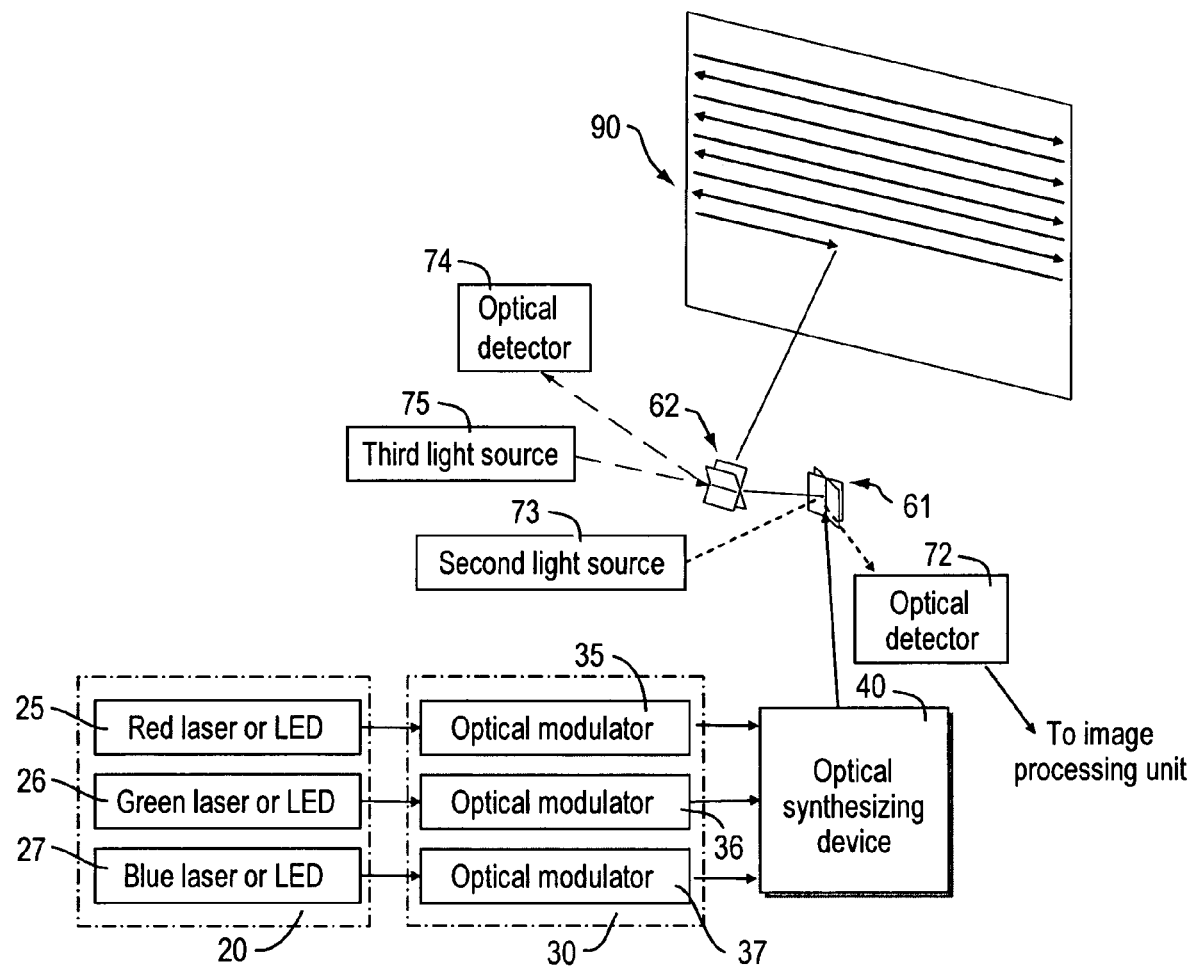
FIG. 4 illustrates an optical sensing unit comprising a light source and an optical detector for detecting the speed and position of the horizontal scanning mirror in one embodiment of the invention.

In one embodiment, mirror sensing unit 70 is an optical detector/transducer 71 (FIG. 3) that detects the scanning speed and position of one of the monochrome light beams. Alternatively as shown in FIG. 4, sensing unit 70 may include an optical detector 72 and a solid state light source 73. Sensing unit 70 determines the horizontal scanning motion by detecting the light beam emitting from light source 73 and reflected by horizontal scanning mirror 61. Furthermore, sensing unit 70 may include an optical detector 74 and another solid state light source 75. Sensing unit 70 determines the vertical scanning motion by detecting the light beam emitting from light source 75 and reflected by vertical scanning mirror 62.

In another embodiment, sensing unit 70 is a capacitance sensor embedded in a scanning mirror to detect a change in capacitance from the movement of reflecting mirror unit 60. Alternatively, sensing unit 70 is a piezoelectric sensor embedded in a scanning mirror to detect a change in current from the movement of reflecting mirror unit 60.

Figure 5:
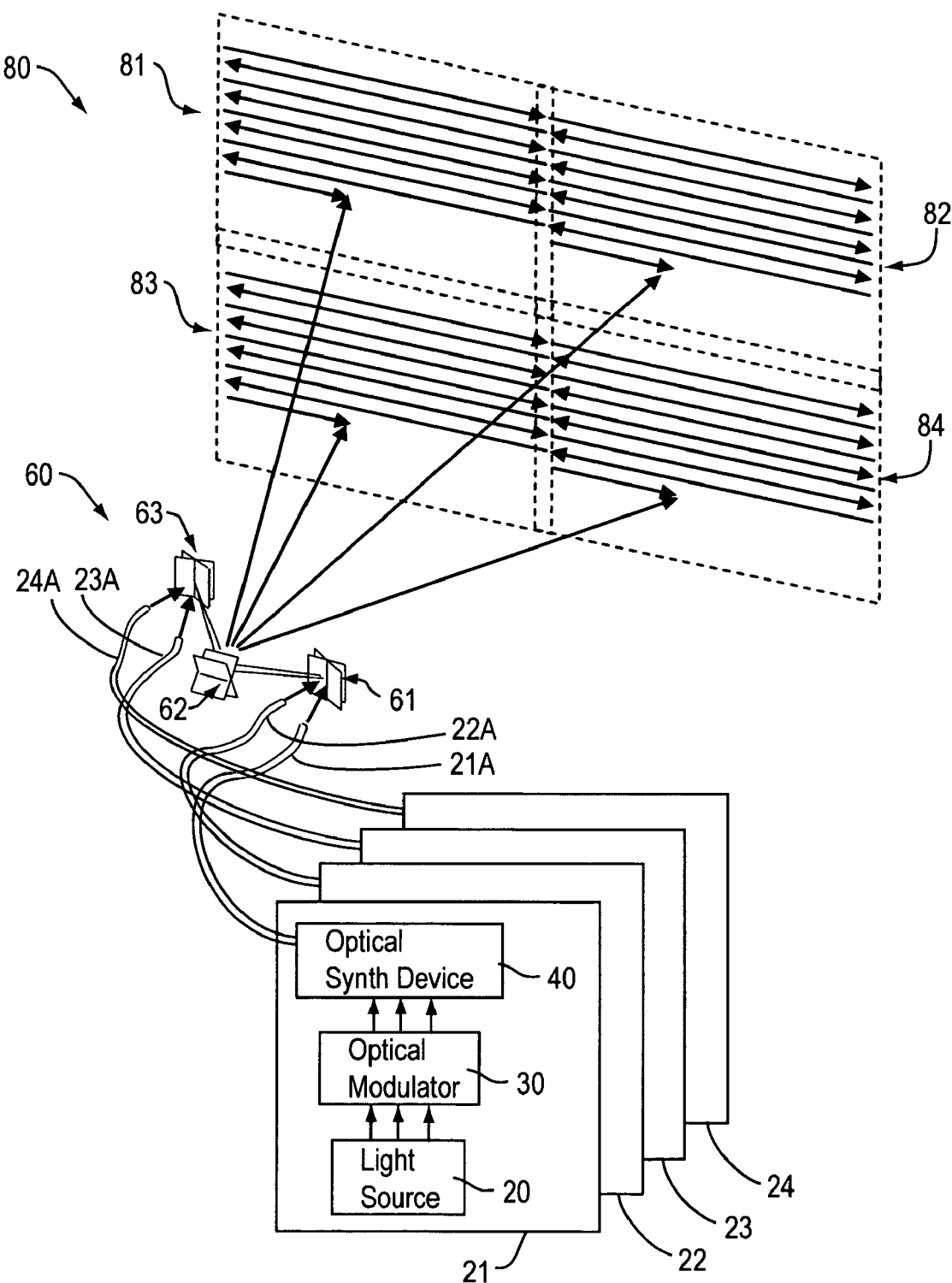
FIG. 5 illustrates a laser projection display system projecting an image consisting of image tiles generated by multiple light source units and a common reflecting mirror unit in one embodiment of the invention.

FIG. 5 shows a projection display system 80 in one embodiment of the invention. Projection display system 80 projects an image that consists of multiple image tiles 81, 82, 83, and 84 generated by a plurality of light source units 21, 22, 23 and 24 reflecting from a common reflecting mirror unit 60. Reflecting mirror unit 60 includes a common vertical scanning mirror 62 that receives light reflected from two horizontal scanning mirrors 61 and 63. Light sources 21, 22, 23, and 24 transmit their respective light beams through optical fibers 21A, 22A, 23A, and 24A, which are oriented so resulting image tiles 81, 82, 83, and 84 form a seamless unified image with substantially higher resolution than the resolution achievable by a single light source unit. Thus, the optical fibers allow easy alignment and assembly of projection display system 80.

Figure 6:
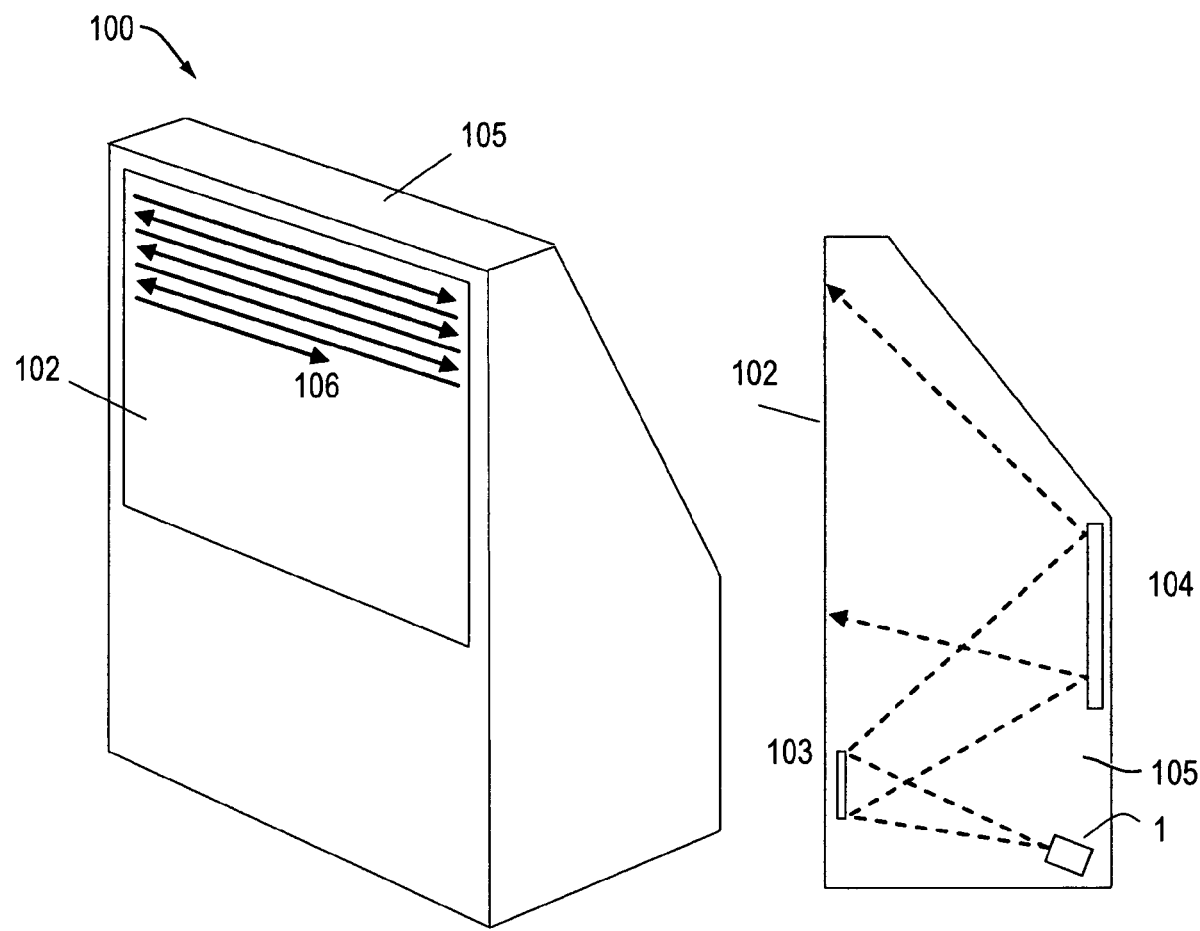
FIG. 6 illustrates a laser projection display system in a casing including a translucent screen and a plurality of diffusers and lenses in one embodiment of the invention.

FIG. 6 shows a projection television 100 in one embodiment of the invention. Projection television 100 includes a translucent screen 102 and a plurality of lenses 103 and diffusers 104 all located in a casing 105. Lenses 103 and diffusers 104 expand the projected images from projection display system 1 to form an enlarge image 106 on translucent screen 102 for viewing.

Digital projectors that employ DMD, LCD, and LCoS technologies use either halogen or metal halide bulbs as their light source. These bulbs have a short lifetime of less than 6,000 hours. Conventional laser projection systems utilize high power lasers and mechanical deflectors, polygonal mirror, and galvanometer mirror. They consume a large amount of electrical power and generate a substantial amount of heat. The conventional laser projection system also may require special cooling. Furthermore, they are inherently cumbersome and expensive.

Figure 7:
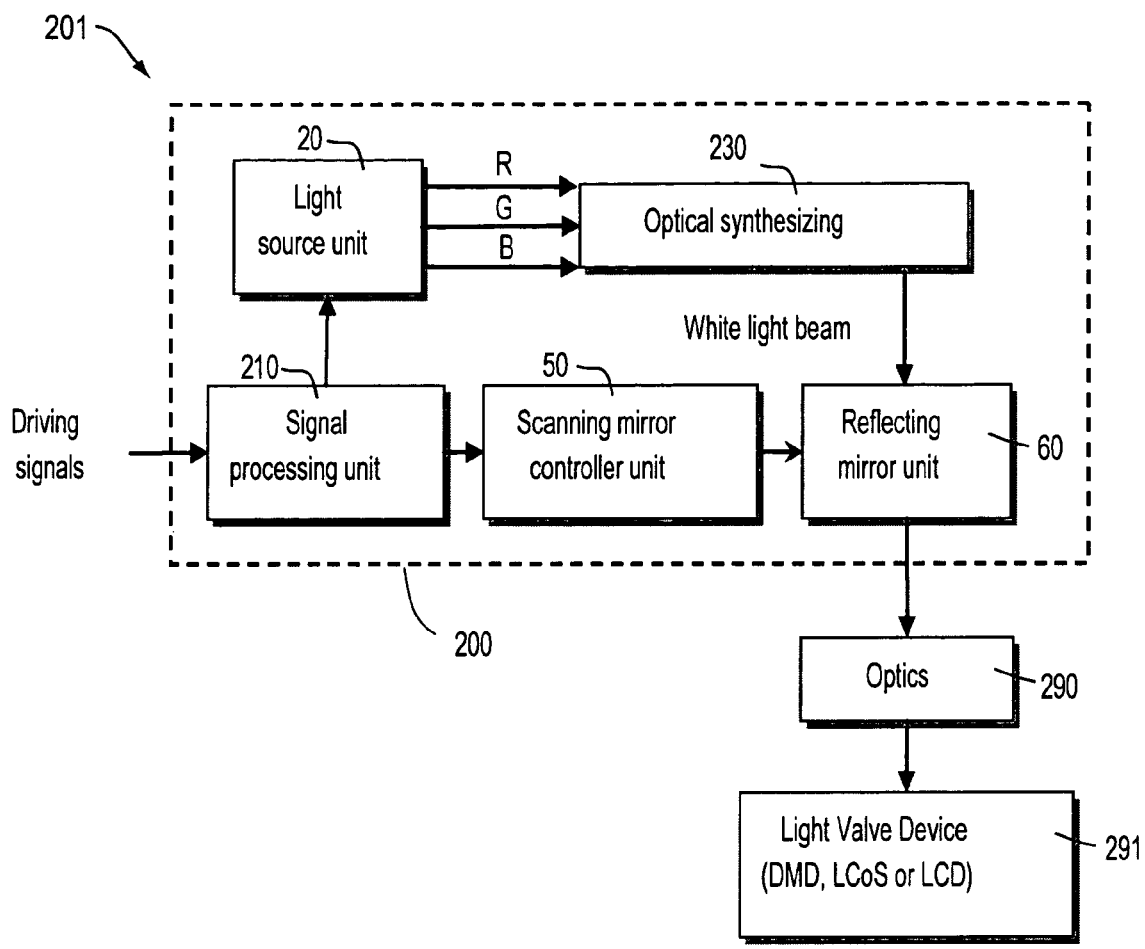
FIG. 7 is a block diagram of a system where a laser projection display system is the light source for a light valve device such as a digital micromirror device (DMD), a liquid crystal on silicon (LCoS) display, or a liquid crystal display (LCD) in one embodiment of the invention.

FIG. 7. shows a block diagram block diagram of a projection illumination system 200 that may be used as the light source for a digital projector 201 employing a light-valve device 291 such as digital micromirror device (DMD), liquid crystal display (LCD), or liquid crystal on silicon (LCoS) display. System 200 includes a signal processing unit 210, a light source unit 20, an optical synthesizing device 230, a scanning mirror controller unit 50, and a reflecting mirror unit 60. The red, green and blue monochrome light beams emitting from light source unit 20 is combined by optical synthesizing device 230 into a white light beam and projected onto reflecting mirror unit 60. Reflecting mirror unit 60 scans the white light beam horizontally and vertically to illuminate a two-dimensional area over optics 290 of digital projector 201. Optics 290 then directs the light beam onto light-valve device 291. Light-valve device 291 then modulates the light beam to project a desired image.

Figure 8:
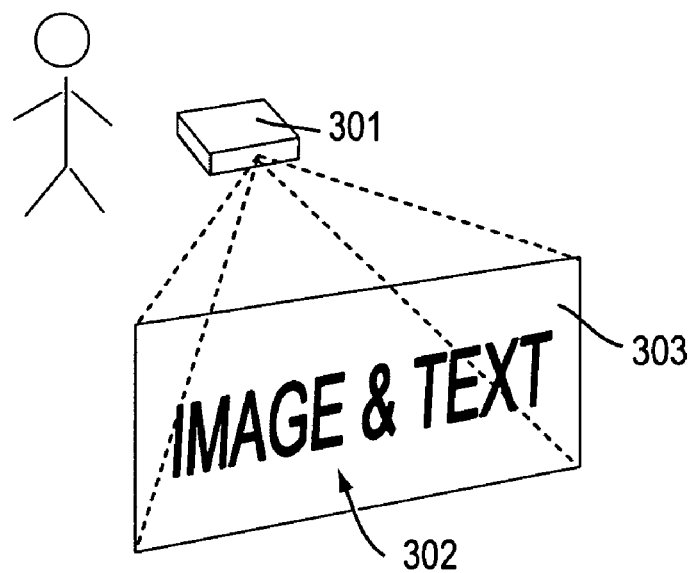
FIG. 8 illustrates a MEMS projection display where the image is projected from the same side of the viewer onto a screen in one embodiment of the invention.

FIG. 8 illustrates a MEMS projection illumination system 301 in one embodiment of the invention. System 301 includes a MEMS scanning light source that illuminates an image 302 on a medium 303. The MEMS scanning light source includes a plurality of solid state lasers emitting monochrome red, green and blue light beams that are modulated and synthesized into a single light path in desired color. The single light path is raster scanned by MEMS scanning mirrors (e.g., a reflecting mirror system) onto medium 303. The scanned light beam reflects off image 302, which becomes visible to passersby. The system is able to raster scan the entire medium 303 within the refresh rate of the human eyes so image 302 appears uniformly lighted. Image 302 can be any form of advertisement including text. Medium 303 can be a wall, a screen, a sign, or a billboard.

Figure 9:
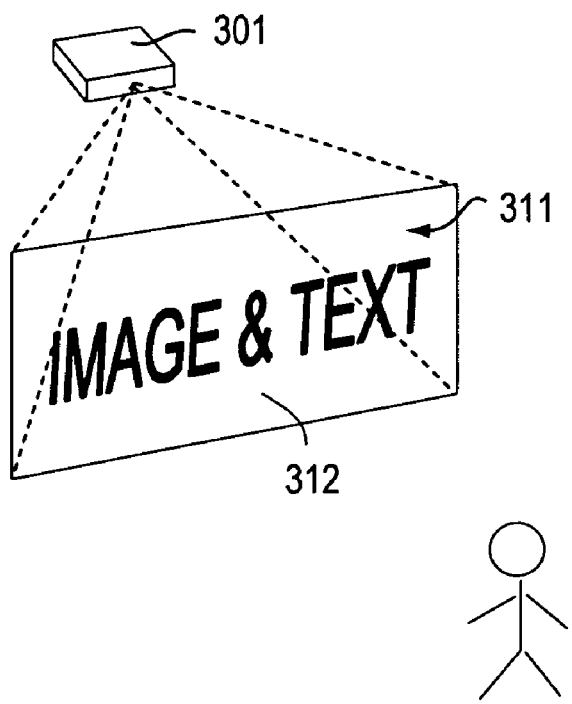
FIG. 9 illustrates a MEMS projection display where the image is projected from the opposite side of the viewer onto a screen that is semi-transparent in one embodiment of the invention.

FIG. 9 illustrates MEMS projection illumination system 301 in another embodiment of the invention. System 301 includes a MEMS scanning light source that raster scans a light beam over an image 311. Image 311 is on a semi-transparent material 312 so the image is visible on both sides. Thus, image 311 is visible to a passerby on the opposite side of the system 301. Image 311 can be part of a screen, a sign, or a billboard.

Figure 10:
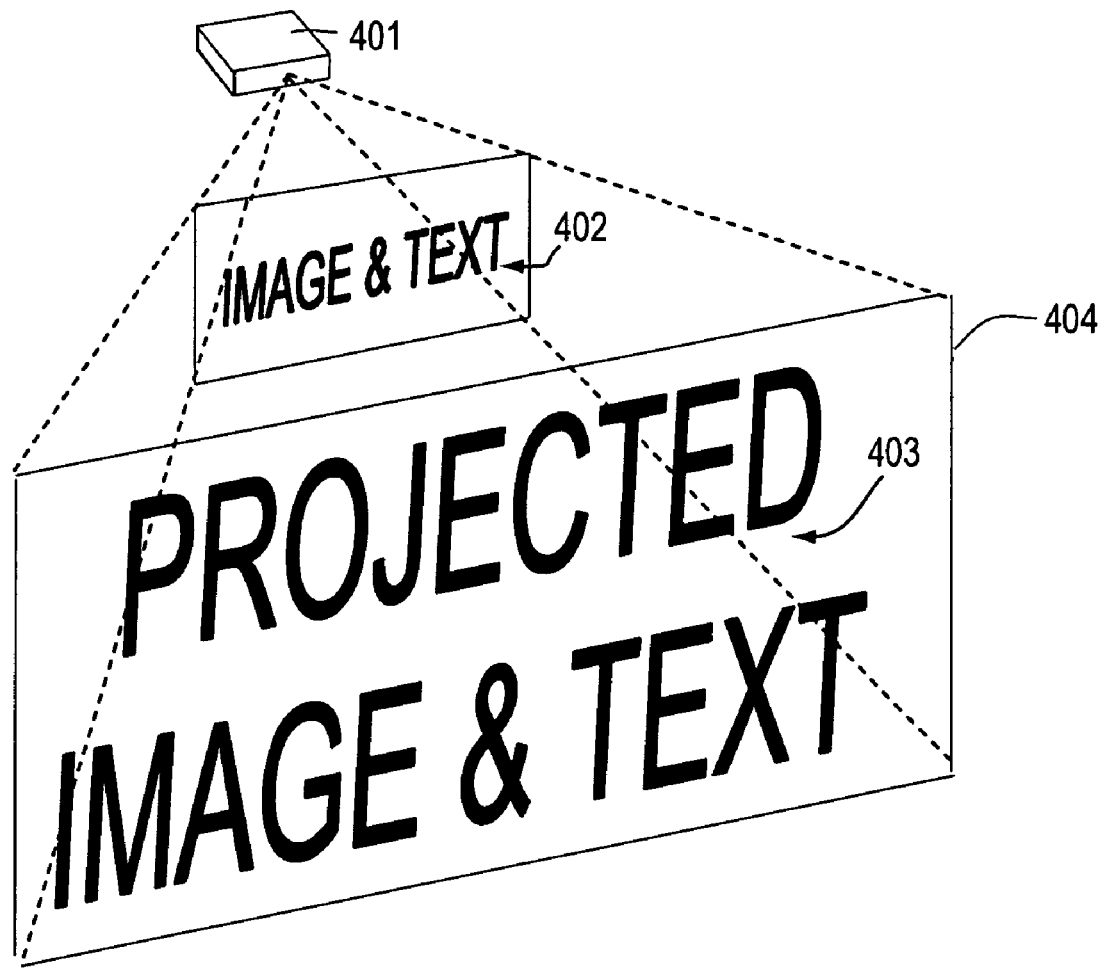
FIG. 10 illustrates a MEMS projection display that projects a semi-transparent image to create a larger image in one embodiment of the invention.

FIG. 10 illustrates a MEMS projection illumination system 401 in one embodiment of the invention. System 401 includes a MEMS scanning light source that raster scans a light beam over a semi-transparent image 402 to project a larger image 403 onto a medium 404. Thus, MEMS projection illumination system 401 can replace the traditional light bulb in overhead projectors, slide machines, and LCD projectors to provide better performance and reliability, and lower power consumption.

Figure 11:
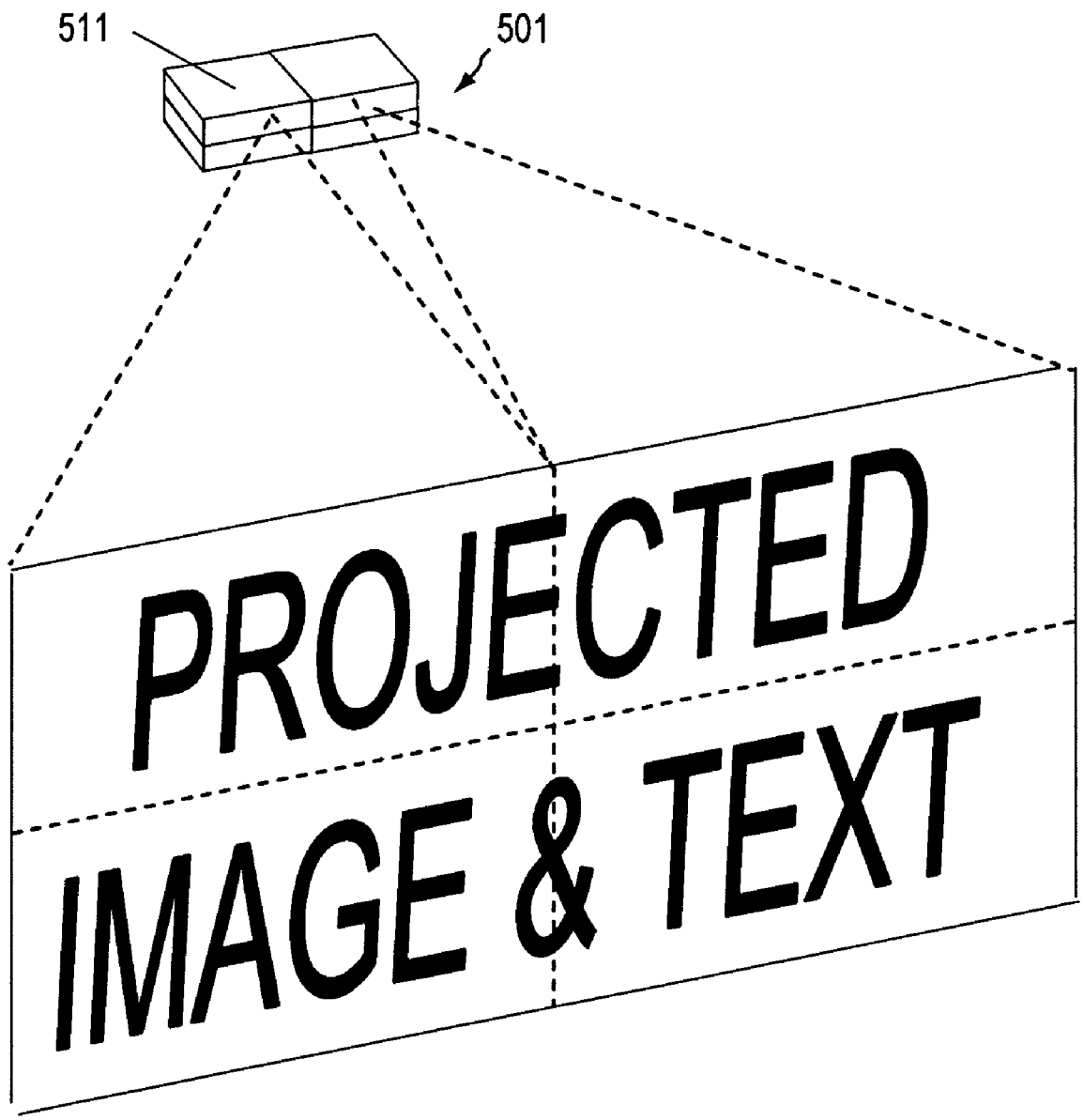
FIG. 11 illustrates a MEMS projection display that utilizes a mirror array to increase the image resolution and brightness of the projected image in one embodiment of the invention.

FIG. 11 illustrates a MEMS projection illumination system 501 in one embodiment of the invention. System 501 includes multiple MEMS scanning light sources 511 that are used to illuminate their respective portion of an image. Thus, system 501 is able to provide better illumination and higher resolution.

Figure 12:
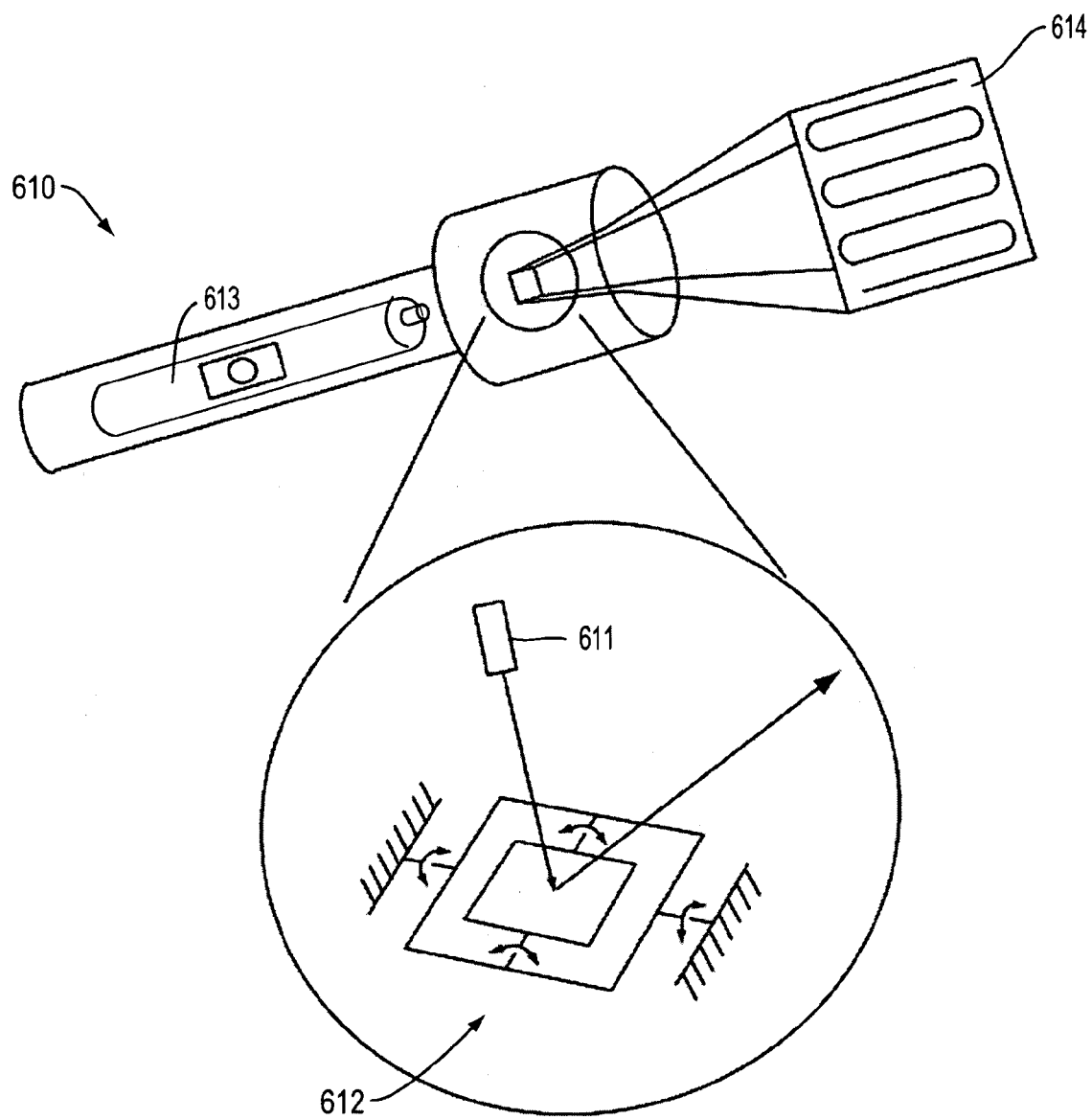
FIG. 12 illustrates a flash light in one embodiment of the invention.

FIG. 12 illustrates a flash light 610 in one embodiment of the invention. Flash light 610 includes a solid state light source 611 and a MEMS scanning mirror 612. Both solid state light source 611 and MEMS scanning mirror 612 are powered by a battery 613. Solid state light source 611 generates a light beam that is raster scanned by MEMS scanning mirror 612 over an area 614 that is to be illuminated. In one embodiment, solid state light source 611 generates an infrared light to illuminate area 614 at night. Light reflected from area 614 are then detected by an infrared detector.

Various other adaptations and combinations of features of the embodiments disclosed are within the scope of the invention. Numerous embodiments are encompassed by the following claims.

What is claimed is:

1. A projection illumination system, comprising:
   a solid state light source unit emitting at least one light beam; and
   a reflecting mirror unit for raster scanning the light beam over an image, wherein:
      the image is an existing image on a medium selected from the group consisting of a wall, a screen, a sign, and a billboard; and
      said raster scanning comprises moving the light beam along horizontal and vertical directions at a sufficient refresh rate that allows a human viewer to see an entire image without flicker.

2. The system of claim 1, wherein the solid state light source unit comprises at least one solid state light source selected from the group consisting of semiconductor edge emitting laser diodes (LD), vertical cavity surface emitting laser diodes (VCSEL), diode pumped solid state frequency doubled (DPSSFD) lasers, and light emitting diodes (LED) for desired color.

3. The system of claim 1, wherein the reflecting mirror unit is selected from the group consisting of:
   a bi-directional micro-electro-mechanical system (MEMS) scanning mirror;
   a first MEMS scanning mirror rotating about a horizontal axis and a second MEMS scanning mirror rotating about a vertical axis; and
   at least one galvanometer mirror manufactured by mechanical processes.

4. A projection illumination system, comprising:
   a solid state light source unit emitting at least one light beam; and
   a reflecting mirror unit for raster scanning the light beam over an image, wherein:

the image is an existing image on a semi-transparent material so the image can be viewed on both sides; and said raster scanning comprises moving the light beam along horizontal and vertical directions at a sufficient refresh rate that allows a viewer to see an entire image without flicker.

5. The system of claim 4, wherein the solid state light source unit comprises at least one solid state light source selected from the group consisting of semiconductor edge emitting laser diodes (LD), vertical cavity surface emitting laser diodes (VCSEL), diode pumped solid state frequency doubled (DPSSFD) lasers, and light emitting diodes (LED) for desired color.

6. The system of claim 4, wherein the reflecting mirror unit is selected from the group consisting of:
  a bi-directional micro-electro-mechanical system (MEMS) scanning mirror;
  a first MEMS scanning mirror rotating about a horizontal axis and a second MEMS scanning mirror rotating about a vertical axis; and
  at least one galvanometer mirror manufactured by mechanical processes.

7. A projection illumination system, comprising:
  a solid state light source unit emitting at least one light beam; and
  a reflecting mirror unit for raster scanning the light beam over an image, wherein:
    the image is an existing semi-transparent image; and
    said raster scanning comprises moving the light beam along horizontal and vertical directions to project the image onto a medium to create a larger image at a sufficient refresh rate that allows a viewer to see an entire image without flicker.

8. The system of claim 7, wherein the projection illumination system comprises one of an overhead projector and a slide machine.

9. The system of claim 7, wherein the solid state light source unit comprises at least one solid state light source selected from the group consisting of semiconductor edge emitting laser diodes (LD), vertical cavity surface emitting laser diodes (VCSEL), diode pumped solid state frequency doubled (DPSSFD) lasers, and light emitting diodes (LED) for desired color.

10. The system of claim 7, wherein the reflecting mirror unit is selected from the group consisting of:
  a bi-directional micro-electro-mechanical system (MEMS) scanning mirror;
  a first MEMS scanning mirror rotating about a horizontal axis and a second MEMS scanning mirror rotating about a vertical axis; and
  at least one galvanometer mirror manufactured by mechanical processes.

11. A projection illumination system, comprising:
  a first solid state light source unit emitting at least a first light beam;
  a first reflecting mirror unit for scanning the first light beam over an image to illuminate the image;
  a second solid state light source unit emitting at least a second light beam;
  a second reflecting mirror unit for scanning the second light beam over the image to illuminate the image;
  wherein:
    the first reflecting mirror unit illuminates a first portion of the image while the second reflecting mirror unit illuminates a second portion of the image;
    the image is an existing image on a medium selected from the group consisting of a wall, a screen, a sign, and a billboard; and
    the first and the second light beams are raster scanned at a sufficient refresh rate that allows a viewer to see an entire image without flicker.

12. The system of claim 11, wherein the first and the second solid state light source units comprise at least one solid state light source selected from the group consisting of semiconductor edge emitting laser diodes (LD), vertical cavity surface emitting laser diodes (VCSEL), diode pumped solid state frequency doubled (DPSSFD) lasers, and light emitting diodes (LED) for desired color.

13. The system of claim 11, wherein the first and the second reflecting mirror units are selected from the group consisting of:
  a bi-directional micro-electro-mechanical system (MEMS) scanning mirror;
  a first MEMS scanning mirror rotating about a horizontal axis and a second MEMS scanning mirror rotating about a vertical axis; and
  at least one galvanometer mirror manufactured by mechanical processes.

* * * * *